May 21, 1929.  A. C. WOOD  1,714,288
MILEAGE PERIOD INDICATING ODOMETER

Original Filed Sept. 5, 1922    3 Sheets-Sheet 1

Witness.
N. T. McKnight.

Inventor.
Andrew C. Wood
by Burton & Burton
his Attorneys.

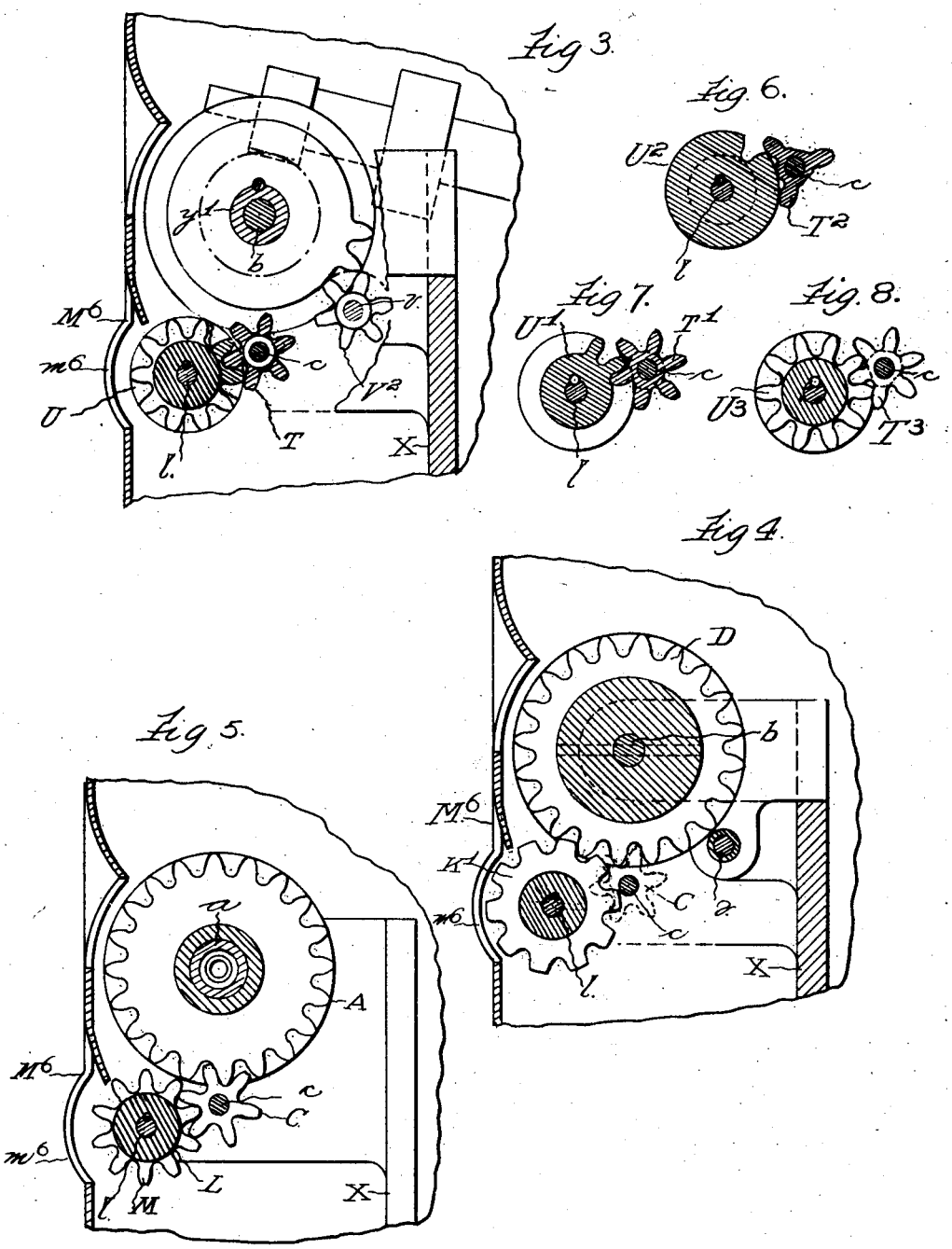

May 21, 1929.  A. C. WOOD  1,714,288
MILEAGE PERIOD INDICATING ODOMETER
Original Filed Sept. 5, 1922   3 Sheets-Sheet 3
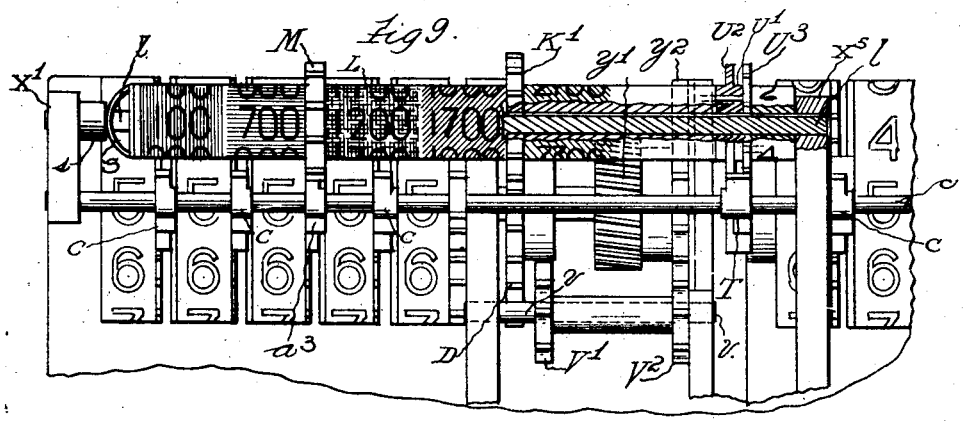
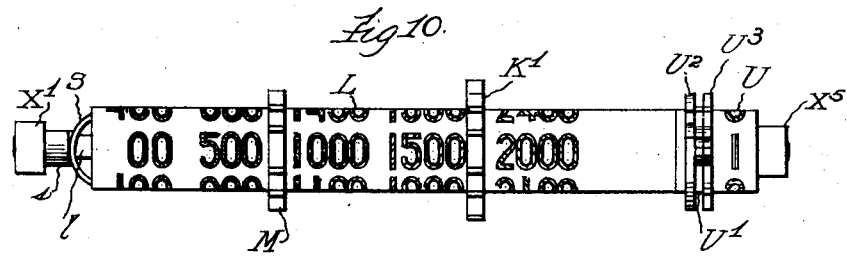
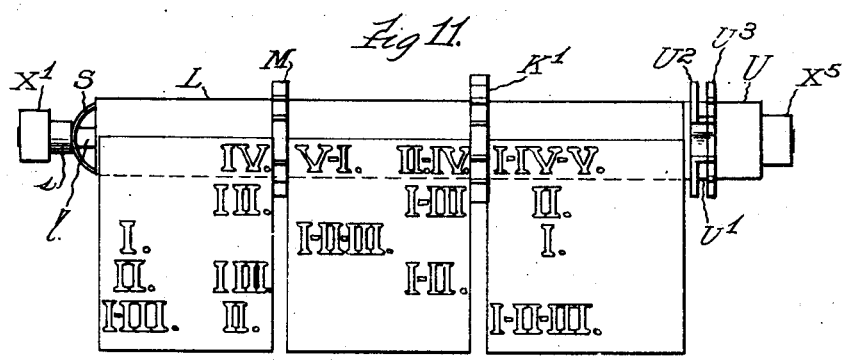
Witness.
N. T. McKnight
Inventor
Andrew C. Wood.
by Burton & Burton
his Attorneys.

Patented May 21, 1929.

1,714,288

UNITED STATES PATENT OFFICE.

ANDREW C. WOOD, OF CHICAGO, ILLINOIS, ASSIGNOR TO STEWART-WARNER SPEEDOMETER CORPORATION, OF CHICAGO, ILLINOIS, A CORPORATION OF VIRGINIA.

MILEAGE-PERIOD-INDICATING ODOMETER.

Original application filed September 5, 1922, Serial No. 586,055. Divided and this application filed July 21, 1927. Serial No. 207,395.

This application is a division of my pending application Serial No. 586,055 filed September 5, 1922, now Patent No. 1,658,069, dated February 7, 1928.

The purpose of this invention is to provide an improved construction in the nature of an odometer operated mileage period indicating or signaling device, particularly adapted for indicating to the driver of the vehicle under the control of the odometer the expiration of the intervals suitable to elapse between various attentions to the vehicle or its appurtenances with the further specific purpose of adapting such mileage period signaling device to be reset at any time or to any degree by the odometer resetting shaft or stem. It consists in the elements and features of construction shown and described as indicated in the claims.

In the drawings:—

Figure 3 is a section at the line, 3—3, on Figure 2.

Figure 4 is a section at the line, 4—4, on Figure 2 with a certain gear at the position at which it is shown in dotted line in Figure 2.

Figure 5 is a section at the line, 5—5, on Figure 2.

Figures 6, 7 and 8 are detail sections transversely of the mileage period indicator shaft and transfer shaft at the three zones respectively of the "Geneva stop movement" employed for the transfer or carrying one revolution in five from the first to the second rotary element of the mileage period indicator.

Figure 9 is a view of a fragment of the instrument looking in the direction of the arrow, 6, on Figure 3.

Figure 10 is a perspective view of the mileage period indicator drum detached or dismounted showing a modified form of the color markings.

Figure 11 is an elevation of the indicator drums with their covering strips bearing the markings stripped off, enabling all the markings to be read, said markings being of a special form in lieu of mileage numerals.

Figure 1:
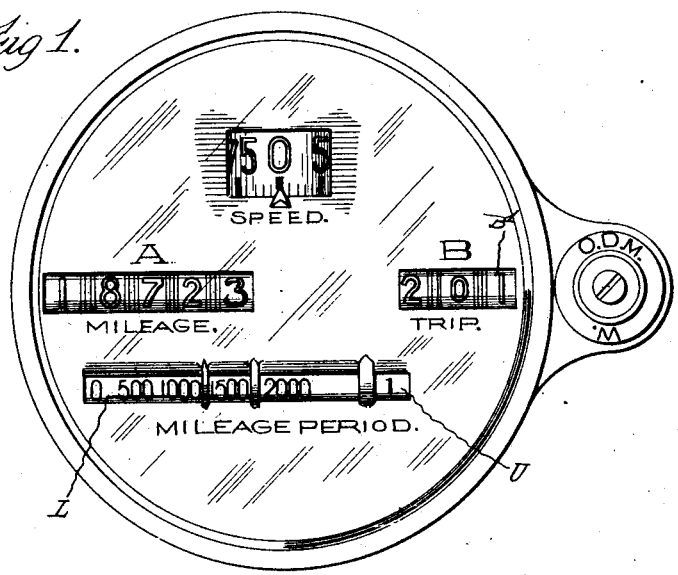
Figure 1 is a front or face view of a combined odometer and speedometer equipped with this invention.

The distinctive element of the present invention consists in the mileage period indicator, as to form and mechanism, independently of its connection with the odometer train for operation thereby. This indicator will be first described. It consists of a drum, L, which is carried for rotation by a shaft, $l$, for which journal bearings are provided in a lug, $X^1$, projecting from a standard, $X^4$, and bracket, $X^5$, projecting directly from the web of the frame, X, which constitutes the mount which carries both the odometer and the indicator mechanisms. A gear, M, on this shaft, $l$, meshes with any selected carrying pinion of the odometer main train dials, preferably, as hereinafter explained, the carrying pinion $a^3$, of the hundreds wheel of said train for this purpose,—that is, the one of which each of its tens digits denotes one hundred miles travel of the vehicle. By this means it will be seen that the drum, L, will be rotated one step for each one hundred miles travel indicated by the odometer main train. The periphery of the drum is subdivided in mileage zones,—as shown five in number,—each of said zones being subdivided into five segments, being half the number of teeth of the gear, M, it being understood that the carrying pinion rotates two teeth distance at each step. The segments of the first zone carry the numerals, 0, 100, 200, 300 and 400. The next zone carries the numerals, 500 to 900, inclusive. The third zone carries the numerals, 1000 to 1400, inclusive and the fourth zone carries the numerals, 1500 to 1900, and the fifth zone 2000 to 2400. Understanding that the numeral "0" on the first zone is equivalent to 2500, as being the next indication to appear after the highest numeral on the fourth zone which is 1900, it will be seen that this zoned drum is adapted to call the driver's attention at the end of every 100 miles travel of the vehicle, provided he is in any manner advised to what service, attention or care-taking functions, respectively, the several mileage numerals as they successively appear relate or are intended to call to attention. To this cylinder there is added, co-axial therewith, a shorter cylinder containing a single zone divided into as many segments as there are zones on the mileage-indicating drum, in the present instance, therefore, five, which are numbered respectively, "1", "2", "3", "4" and "5". This zone-number dial or drum indicated by the letter U, is connected for operation by the shaft of the mileage indicating drum by any convenient speed reducing means, such as a familiar decimal-carrying means of odometer trains, only that instead of reducing speed decimally, the intermeshing gear elements of the familiar "Geneva stop movement" type are toothed for transmitting one-fifth of the revolution to the zone member dial, U, for each full revolution of the mileage period drum L. This may be accomplished most conveniently by utilizing the carrying pinion shaft of the odometer train for journaling the three-zone carrying or transfer pinion, $T^1$, $T^2$, $T^3$, of the mileage period indicating device which for the purpose of carrying at the ratio stated has its mutilated zones, $T^1$ and $T^2$, co-operating with the zones of the mutilated gear, $U^1$, $U^2$, on the shaft, $l$, and its complete-toothed zone, $T^3$, meshing with the complete gear element, $U^3$, on the number dial wheel, U.

As may be understood from the hereinafter contained limited description of the odometer trains, a certain position of the trip train shaft for which the resetting devices make provision positions a gear, D, thereon in mesh with the gear, $K^1$, which is fast on the shaft, $l$, of the mileage period signaling device, and out of mesh with a pinion member, $V^1$, which constitutes the connection of said driving gear, D, with the driving means-in-common of the main and trip odometer trains; and at that position of said shaft, B, it is out of driving connection with the trip train.

All the graduated members of the drum, L, have feathered engagement with the shaft, $l$, for rotation therewith, with freedom for sliding thereon. This is for the purpose of providing frictional drive from the gear, M, to the drum members, said gear, M, being interposed on the shaft, $l$, between two of the graduated drum members and held frictionally between them by means of a spring spider washer, S, which is held on the left hand end of the shaft, $l$, by a suitable nut, $s$, its three spider fingers pressing against the outer surface of the left hand drum member.

It may be understood, therefore, without giving consideration to the detail construction of the odometer trains that it is possible, by rotating the shaft, $b$, for which provision is made in the odometer reset devices, as hereinafter described, to rotate the drum shaft of the mileage period indicator and thereby to rotate all the drum members thereon regardless of the fact that they are mounted and connected for being driven by gear connection with the odometer train and remain thus connected during the period of resetting of the mileage period indicator which is accomplished by thus rotating the shaft, $b$ (by means of the reset shaft) at the adjusted position described.

For the mileage period indicating device there is provided a casing, $M^6$, which has a reading slot, $m^6$, at which the aligned numerals of all the zones of the zoned drum can be read as they are successively brought around thereto by the mileage indicating operation of the odometer main train, while the numeral markings of the rotor, U, are also successively brought to the reading slot for advising the driver which of the zones of the zoned drum is to be referred to for the warning which is due.

A chart informing the driver which attention is due at each of the mileages indicated by the appearance of the several mileage numerals at the reading slot, enables him to select and interpret the proper warning in each instance.

The desirable marking of the several zones and corresponding markings of the several segments of the zone number dial, U, is by color, each zone being of different ground color, and the corresponding segments of the dial, U, being respectively of the same ground color; or the numerals on the several zones, respectively, may be of different color, the numerals of the dial, U, corresponding to the respective zones being of the same colors. These two color methods are shown respectively in Figures 9 and 10.

It may be found convenient to apply "job" numbers or letters to the several duties calling for attention at different mileage intervals, and to employ these job numbers or letters on the mileage period indicating drum instead of the numerals denoting the mileages as such. The markings of a drum in this manner instead of with the mileage numerals is shown in Figure 11, which may be understood as representing a drum having the markings made upon paper or fabric strips wrapped about the drum and shown in said figure unrolled or stripped from the drum so that all the markings may now be read. The particular schedule according to which this drum is marked is as follows:

Job No. 1.—Any duty requiring attention at 200 miles intervals;
Job No. 2.—Any duty requiring attention at 300 miles intervals;
Job No. 3.—Any duty requiring attention at 400 miles intervals;
Job No. 4.—Any duty requiring attention at 500 miles intervals;
Job No. 5.—Any duty requiring attention at 1,000 miles intervals;
Job No. 6.—Any duty requiring attention at 2,000 miles intervals.

Figure 2:
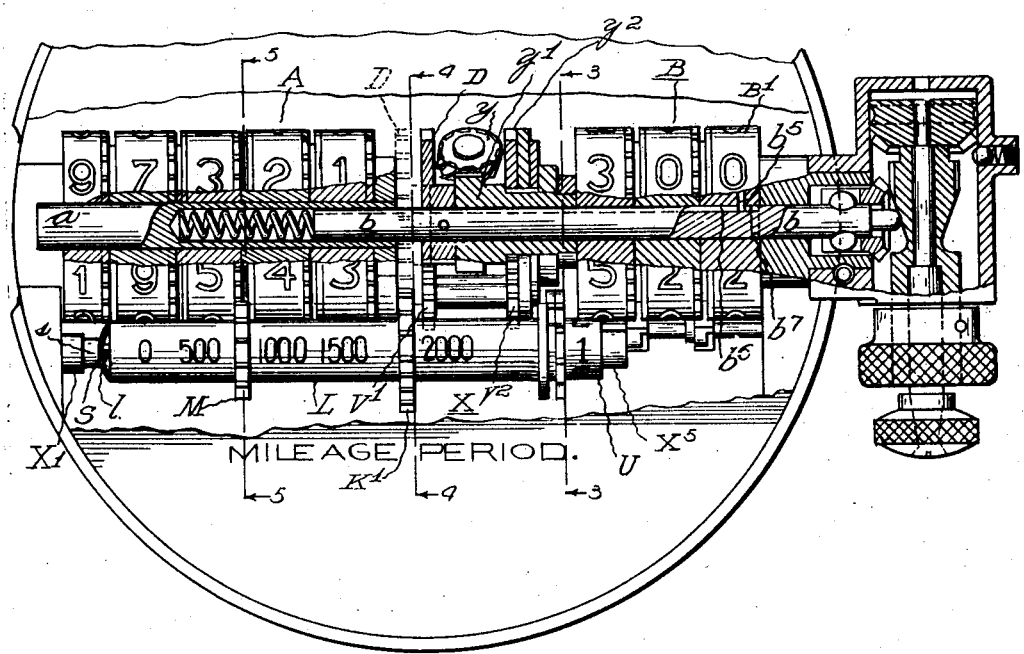
Figure 2 is a front elevation of the same on a larger scale with the face plate partly broken away disclosing the interior mechanism, the same being shown in section at the plane of the axis of the odometer train and the reset shaft, the latter being turned 90 degrees from the position shown in Figure 1.

For co-operating with the mileage period indicator as above mentioned, the odometer mechanism comprises a main train comprising the dials of group A at the left hand of Figure 2 and the dials of the group B at the right hand of said figure, mounted, as is most customary upon an axial shaft-in-common of which the member, $b$, extends through the trip train series of dials and is telescopically and longitudinally yieldingly connected with the portion, $a$, which extends through the main train of dials, A. The carrying from dial to dial of each of these trains is effected in the familiar manner by means of carrying pinions seen at C, on the shaft $c$, with respect to the trip train and at T on the same shaft extended past the main train. The shaft, $b$, is longitudinally movable through the dials. Inwardly beyond the inner end of the trip train this shaft carries rigidly the gear, D, above mentioned, and at its extent through the initial dial, $B^1$, of the trip train it is engaged with said dial by means of the pin, $b^5$, projecting from the body of said dial wheel into a longitudinal groove, $b^6$, in said shaft, $b$, so that in the normal position of the shaft, $b$, at which, as may be understood without particular description, it is operatively connected by means of the gear, D, with the in-leading power shaft,—it serves for driving said initial dial wheel of the trip train, and thereby, through the carrying pinions in the usual manner, the succeeding dials of that train. As above mentioned the hundreds-carrying pinion, T, of the odometer main train is meshed with the gear, M, of the mileage period indicator. At said normal position of the shaft, $b$, and gear, D, thereon, said gear, D, constitutes means of connecting the shaft, $b$, with the in-leading power shaft, said connection being completed by the two-membered pinion, $V^1$, on the counter-shaft, $v$, the member, $V^1$, being engaged with the gear, D, and the member, $V^2$, with the gear member, $y^2$, carried rigidly by the spiral gear, $y^1$, which is directly meshed with the spiral gear, $y$, on the in-leading power shaft, Y. It may be understood therefore, that longitudinal in-thrust of the shaft, $b$, carrying the gear, D, out of mesh with the pinion, $V^1$ disconnects the odometer trip train from the driving power. The shaft, $b$, has at a point a short distance to the right of the position of the pin, $b^5$, at the normal position of the shaft, $b$, a circumferential groove, $b^7$. The amount of movement of the shaft, $b$, which merely takes the gear, D, out of mesh with the pinion, $V^1$, does not bring the groove, $b^7$, to the pin, $b^5$, but leaves that pin still engaged in the longitudinal groove, $b^6$, of the shaft, $b$, so that rotation of the shaft, $b$, by the resetting means,—(which may be understood from the drawings without particular description) serves for resetting the trip train quite independently of the in-leading driving means. But a short further in-thrust of the shaft, $b$, beyond the position at which the resetting of the trip train may be effected by rotation of that shaft, brings the circumferential groove, $b^7$, into registration with the pin, $b^5$, so that the shaft, $b$, loses its driving connection with the trip train. This further in-thrust of the shaft, $b$, brings the gear, D, into mesh with the gear, $K^1$, of the mileage period indicator so that means provided for manually rotating the shaft, $b$, will serve for resetting the indicator drums without any operation of the trip train, in view of the fact that said mileage period indicator is operated for the normal rotation of its parts by the frictional connection described between the gear, M, and the drum members so that the latter are operated by the driving engagement described with the gear, $K^1$, quite independently of the engagement through the gear, M, with the odometer main train.

I claim:—

1. In combination with an odometer dial train, a mileage period indicating device consisting of a rotor having at each of a plurality of zones a progressive series of numerical mileage markings, each of said series covering the same mileage range and being numerically successive so as to constitute, taken together in their order a single series of mileages from the lowest number on the first to the highest number on the last series, said device comprising also a rotor having a zone containing a series of distinctive markings corresponding to and adapted to indicate the zones of the first rotor.

2. In the construction defined in claim 1, foregoing, said zones, except the last mentioned, being distinguished from each other in respect to surface appearance, and otherwise than by position, and the distinctive markings on the last mentioned rotor being in correspondence respectively with the said distinctive surface appearance of the zones of the first rotor.

3. In the construction defined in claim 1, foregoing, said zones of the first mentioned rotor being distinguished from each other in color, the distinctive markings on the last mentioned rotor being identified respectively with the respective zones of the first rotor by correspondence of said markings in color to said zones respectively.

4. In combination with an odometer dial train, a mileage period indicating device consisting of a rotor having at each of a plurality of circum-axial zones a progressive series of numeral mileage markings, all said series covering the same mileage range and being numerically successive so as to constitute, taken together in their order, a single progressive series of mileage from the lowest number in the first to the highest number in the last series, the corresponding numerals in the several series being aligned transversely of said zones, a second rotor having a circum-axial series of markings for indicating the zones respectively, of the first rotor and means for rotating the second rotor from marking to marking thereof as the first rotor makes successive revolutions.

5. In combination with an odometer dial train, a mileage period indicating device consisting of a rotor having at each of a plurality of zones a progressive series of numerical mileage markings, each of said series covering the same mileage range and being numerically successive so as to constitute, taken together in their order a single series of mileages from the lowest number on the first to the highest number on the last series, said device comprising also a rotor having a zone containing a series of distinctive markings corresponding to and adapted to indicate the zones of the first rotor; a driven gear positively engaged with the odometer train and frictionally connected with said first mentioned rotor, the odometer train having a gear adapted for said positive engagement; a shaft which carries said last mentioned gear and means for disengaging said shaft from the odometer train and for rotating the same while thus engaged for resetting the mileage period indicator.

In testimony whereof, I have hereunto set my hand at Chicago, Illinois, this 18th day of July, 1927.

ANDREW C. WOOD.